United States Patent [19]

Nye

[11] Patent Number: 5,386,538
[45] Date of Patent: Jan. 31, 1995

[54] DATA CACHE ACCESS FOR SIGNAL PROCESSING SYSTEMS

[75] Inventor: Jeffrey L. Nye, Houston, Tex.

[73] Assignee: Texas Instruments Incorporated, Dallas, Tex.

[21] Appl. No.: 693,853

[22] Filed: Apr. 30, 1991

[51] Int. Cl.6 .................................................. G06F 12/02
[52] U.S. Cl. ......................... 395/425; 364/DIG. 1; 364/254.8
[58] Field of Search ................... 364/200 MS, 900 MS; 395/400, 425

[56] References Cited

U.S. PATENT DOCUMENTS

| | | | |
|---|---|---|---|
| 4,833,603 | 5/1989 | Morganti et al. | 395/425 |
| 4,928,239 | 5/1990 | Baum et al. | 395/425 |
| 5,073,851 | 12/1991 | Masterson et al. | 395/425 |
| 5,091,846 | 2/1992 | Sachs et al. | 395/250 |
| 5,119,485 | 6/1992 | Ledbetter, Jr. et al. | 395/425 |
| 5,136,702 | 8/1992 | Shibata | 395/425 |
| 5,179,689 | 1/1993 | Leach et al. | 395/425 |

*Primary Examiner*—Joseph L. Dixon
*Assistant Examiner*—Hiep T. Nguyen
*Attorney, Agent, or Firm*—Robert D. Marshall, Jr.; James C. Kesterson; Richard L. Donaldson

[57] ABSTRACT

A data memory management unit for providing cache access in a signal processing system. A programmable translation unit and an address processor are used to alter the manner in which addresses are translated and the cache is filled, respectively. The translation unit and address processor operate in accordance with a selected cache replacement mechanism, which is selected so that the cache is filled in a manner most likely to have a high hit rate for the processing algorithm currently in operation.

19 Claims, 2 Drawing Sheets

DATA CACHE ACCESS FOR SIGNAL PROCESSING SYSTEMS

TECHNICAL FIELD OF THE INVENTION

This invention relates to signal processing, and more particularly to improving use of a memory cache for data to be processed by the system.

BACKGROUND OF THE INVENTION

Memory caching is a technique used with computer systems to provide fast access to frequently used data or instructions. In a typical cached system, a fast auxiliary memory provides the cache, under control of a microprogram that moves cached instructions or data in and out of the cache memory as needed.

The general concept is that when a memory word is referenced, it is brought from larger slower memory into the cache, so that the next time it is used, it may be accessed quickly. The underlying premise of caches is that memory references made during any short time period tend to use only a small part of a computer system's total memory. For example, instructions in a program algorithm tend to have a high degree of spatial and temporal proximity. Likewise, data to be processed tends to be predictable in terms of the proximity of the next data to be processed.

For general computing applications, efficient cache system guidelines and techniques have been developed, based on the spatial and temporal proximity characteristics of typical computer programming. However, for some specialized computing applications, these guidelines may no longer apply.

One type of computing application that exhibits unique proximity characteristics is image processing. Image data are more spatially oriented and temporal assumptions do not apply. Other signal processing applications, in addition to image processing, operate on large amounts of data in a manner that is not characteristic of conventional programming. However, these data operations do tend to be predictable with respect to the spatial orientation of the data to be processed.

Because of the differences in data handling for signal processing application, accepted guidelines for cache design for conventional computer programming are not acceptable. A need exists for an improved cache design for signal processing applications.

SUMMARY OF THE INVENTION

One aspect of the invention is a data cache for a signal processing system. The image processing system is assumed to have a main processor and a main data memory. The cache comprises a cache memory for storing data to be used by the main processor. A buffer stores addresses of data stored in the cache, such that addresses of data required by the main processor may be mapped to addresses stored in the cache. A comparator then determines whether these addresses are matched, so that if a cache hit has occurred, the cache data is delivered to the main processor. A translation unit maintains the buffer based on a selected cache replacement mechanism. An address processor calculates addresses to be fetched from a main memory of the processing system to fill the cache, based on the selected cache replacement mechanism. The particular cache replacement mechanism to be used is supplied by the main processor via a replacement mechanism selection register.

A technical advantage of the invention is that cache line replacement may be configured according to the algorithm in process. This permits the cache to be filled with the data most likely to be required and improves the cache "hit rate". The ability to process and display images in real time is greatly improved.

DETAILED DESCRIPTION OF THE INVENTION

Figure 1:
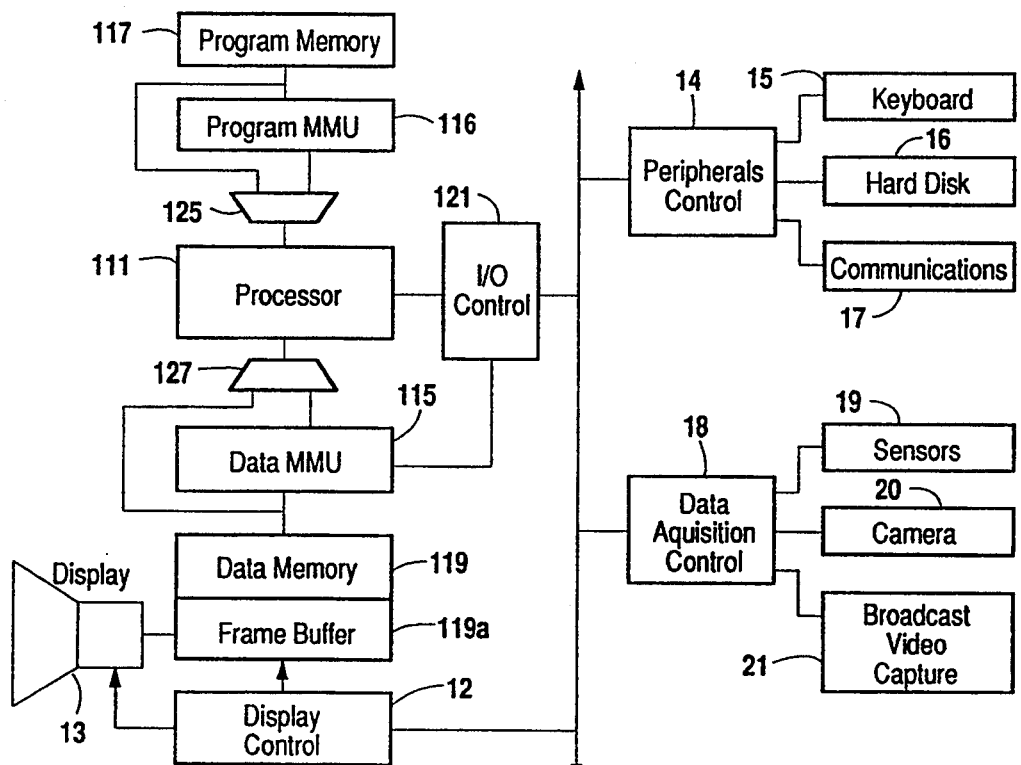
FIG. 1 illustrates a typical signal processing system, with which the invention is used.

FIG. 1 is a block diagram of a typical signal processing system. Processor 111 may be either a general purpose processor or a dedicated signal or graphics processor. For purpose of this description, to distinguish processor 111 from other processors, it is referred to as "main" processor 111.

The memory configuration of the system of FIG. 1 is consistent with a typical memory configuration for a signal processing system. A Harvard architecture provides separate paths for instructions and data.

Program memory 117 contains instructions for main processor 111. Program memory management unit (PMMU) 116 contains a standard memory management unit and a cache memory for program memory.

Data memory 119 contains data to be processed by main processor 111. Data memory management unit (DMMU) 115 contains a special memory management unit, structured as described below in connection with FIG. 2, and a cache memory. As explained below, DMMU 115 permits the cache replacement mechanism to be programmed in accordance with the algorithm in process.

I/O control unit 121 provides system support for peripheral devices 15–17, data acquisition devices 19–21, and display 13. The peripheral devices include keyboard 15, hard disk 16, and communications unit 17, and are controlled by peripherals control unit 14. The data acquisition devices include sensors 19, camera 20, and broadcast video capture unit 21, and are controlled by data acquisition control unit 18. Display 13 is controlled by a display control device 12. All of these peripheral, data acquisition, and display devices may be those used in conventional signal processing systems.

Multiplexers 125 and 127 provide alternate data paths for flexibility. Thus, access to memory by main processor 111 may be to PMMU 116 or to DMMU 115 or may be directly to program memory 117 or data memory 119.

Figure 2:
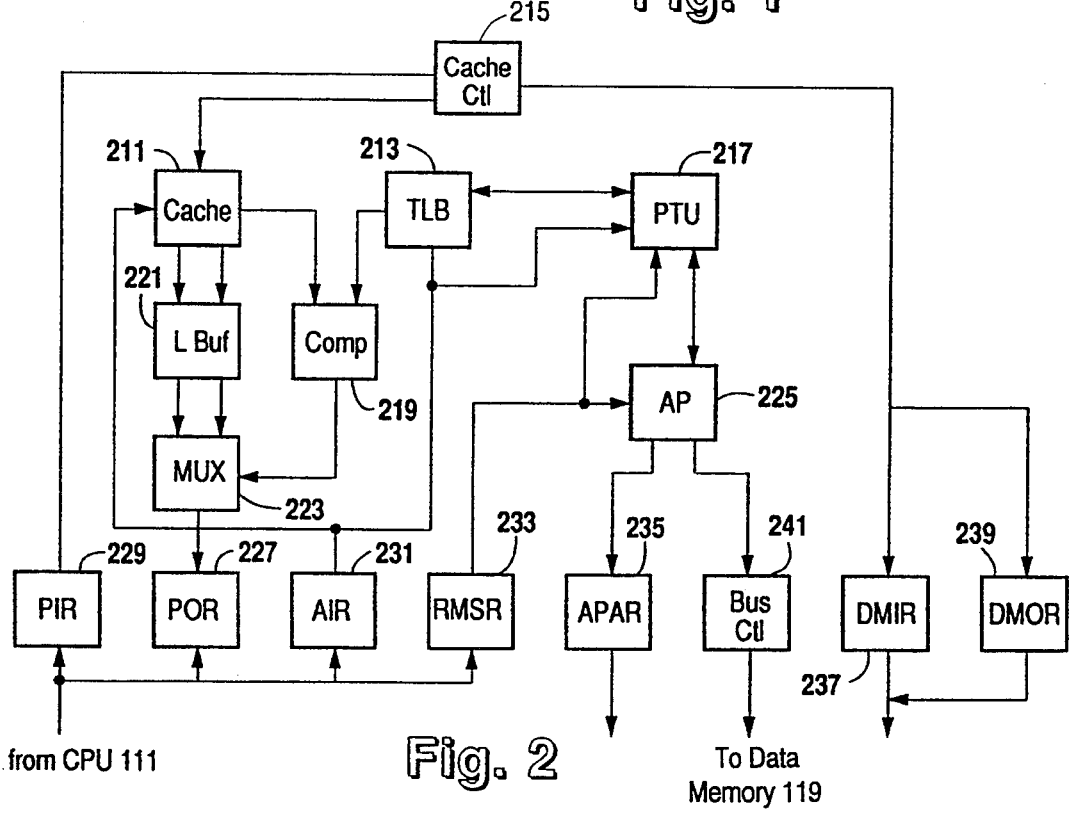
FIG. 2 illustrates the data memory management unit of FIG. 1.

FIG. 2 is a block diagram of DMMU 115. For purposes of explanation, DMMU 115 is based on a MMU architecture used with the Clipper microprocessor, manufactured by Fairchild Semiconductor Corporation. However, the exact configuration shown in FIG. 2 is not necessary to the invention, with important features being programmable translation unit 217, address processor 225, and replacement mechanism selection register 233. Thus, DMMU 115 may have some other means of comparing addresses other than look aside buffer 213.

Cache 211 stores cached data for access by main processor 111. Entries in cache 211 are replaced on a line by line basis, with respect to cache 211. However, as explained below, the general scheme of DMMU 115 is the ability to program the replacement scheme of the cache 211. Thus, cache 211 is not necessarily filled on a line by line basis with respect to the data being processed.

In the preferred embodiment, cache 211 is a four-way cache. This permits four cache locations to which memory 119 can write, which makes it less likely that useful data will be overwritten during cache replacement.

Translation look aside buffer 213 contains the physical addresses of the data stored in cache memory 211. These addresses are provided as a look up table for programmable translation unit 217, to determine if the data to be currently accessed by main processor 111 is already contained in cache 211. Translation look aside buffer 213 is a random access memory (RAM), which maps the data to be accessed to the data currently stored in cache 211.

Cache controller 215 provides control circuitry to access individual cache memory locations for retrieval and insertion of data.

Programmable translation unit 217 maintains and updates translation look aside buffer 213, based on a currently selected cache replacement mechanism. The desired mechanism is indicated by replacement mechanism selection register 233. In the preferred embodiment, programmable translation unit 217 is a state machine, but it may be a processor. It may be programmed in advance with a finite number of replacement mechanisms or may be dynamically programmable.

Comparator 219 compares each entry in translation look aside buffer 213 with an entry in cache 211. If the real address tag in cache 211 compares with the real address in look aside buffer 213, a cache hit occurs. The appropriate entry in the cache line is then selected by multiplexer 223 and clocked into main processor output register 227.

Line buffer 221 stores a line of cache data. It is optional, and is used to improve the efficiency of the cache scheme of DMMU 115. If used, whenever a cache hit occurs, the entire line of data is loaded into line buffer 221.

Processor input register 229 holds data being stored in a cache line location by main processor 111 as part of a write cycle to data memory 119.

Address processor 225 calculates addresses to be fetched from data memory 119 to fill cache 211. This address calculation is based on a scheme selected by replacement mechanism selection register 233 and the inputs to programmable translation unit 217. Address processor 225 contains a hardwired, single cycle, integer arithmetic logic unit (ALU), as well as appropriate control circuitry.

Address input register 231 holds the address of the currently required memory access. This address is supplied by main processor 111.

Replacement mechanism selection register 233 is used by main processor 111 to indicate which addressing mechanism is to be used by address processor 225 to fill invalid or stale entries in cache 211 and translation look aside buffer 213.

Address processor address register 235 holds a calculated address from address processor 225 during the bus cycle for accessing data memory 119.

Data memory input register 237 holds data retrieved from data memory 119 for filling cache 211.

Data memory output register 239 holds data to be stored in data memory 119 as part of the write back or write through cycle from cache 211.

Bus control 241 controls timing to data memory 119 to ensure correct access cycles.

For purposes of example, the operation of DMMU 115 is described in terms of operation of an image processing system, a type of signal processing system. Thus, it is assumed that a primary function of DMMU 115 is the storage of image data, which represents digital images to be displayed on display 13 in real time.

Figure 3:
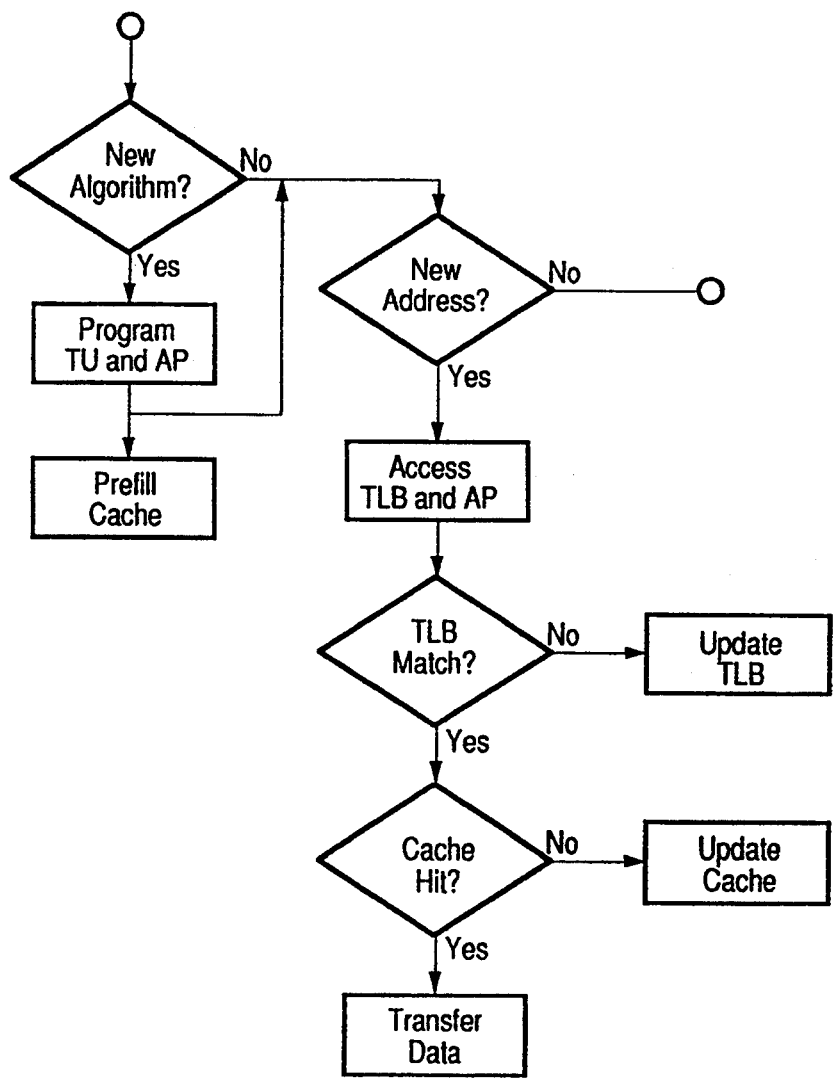
FIG. 3 illustrates a method of cache access using a programmable translation unit and address processor.

Operation of DMMU 115 is illustrated in FIG. 3. To operate the invention, graphics processing algorithms are classified according to the manner in which they access data. Although data is often accessed in a predictable manner, the data is not always "near" in terms of neighboring pixels on a line. Thus, although one type of algorithm might be associated with a line by line access, other typical algorithm types might be block or vector algorithms. When an algorithm is in process, its type can be used to call an appropriate cache line replacement mechanism, and the operation of DMMU 115 is reconfigured accordingly.

One general example of an image processing algorithm is one that performs operations on a group of locally oriented pixels, using "local neighborhood operators". These algorithms typically process sections of the image sequentially. In a conventional cache system, this type of data access results in a large miss rate because the algorithm's continual scanning motion of the image repeatedly crosses boundaries of the data stored in the cache. However, each next group of pixels to be processed has a specific and quantifiable relationship to the currently accessed pixels.

As a more specific example, suppose that a graphics processing algorithm performs a convolution on a block of pixels. A typical convolution algorithm might operate on a 3×3 block, thus it may be classified as a block type algorithm. When this algorithm is in process, the type of algorithm is used to reconfigure DMMU 115 so that cache line replacement mechanism provides image data on a block by block basis. As another example, a graphics algorithm might require processing of a angled line across an image. This would be a vector type algorithm, which would call for a cache line replacement scheme based on a swath of pixels at a predetermined angle.

Once DMMU 115 has been programmed, it operates under the same basic principles as other cache units. When main processor 111 requires a word of data, it checks to see if the word is contained in the cache. It accesses translation look aside buffer 213 and cache 211 concurrently. If a translation look aside buffer hit occurs, the corresponding address is used by comparator 219. If there is a translation look aside buffer miss, programmable translation unit 274 is used for address translation. If a cache hit cannot be made, cache 211 is updated and the data is retrieved from data memory 119.

In an enhancement of the invention, the cache may be designed with a "prefill" feature. While a first cache line replacement mechanism is being used for an algorithm currently in process to fill one portion of cache 211, and second cache line replacement mechanism may be used for the next algorithm to fill another portion of the cache 211.

As stated above, DMMU 115 may be used for signal processing applications other than image processing. The important characteristic of the application is that it have a predictable manner of operating on data, which permits DMMU 115 to be programmed according to algorithm types. This predictability also permits prefilling of cache 211, whereby an upcoming algorithm type to calls a corresponding cache replacement mechanism.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data cache for a signal processing system having a main processor and a main data memory, comprising:
a cache memory for storing data to be used by a main processor;
a replacement mechanism selection register for storing an indication of a selected one cache replacement mechanism of a plurality of cache replacement mechanisms, said indication of said selected cache replacement mechanism stored in said replacement mechanism selection register being supplied by said main processor;
a translation unit connected to said replacement mechanism for translating addresses from said main processor to addresses used by said cache memory, said translating based upon said cache replacement mechanism whose indication is currently stored in said replacement mechanism selection register;
a comparator connected to said main processor and said translation unit for determining from addresses whether data currently required by said main processor are stored in said cache memory, said comparator supplying said currently required data to said main processor from said cache memory if said currently required data is stored in said cache memory; and
an address processor connected to a main memory and said replacement mechanism selection register for calculating addresses of data to be fetched from said main memory of the signal processing system to fill said cache memory if said currently required data is not stored in said cache memory, said calculating based upon said cache replacement mechanism whose indication is currently stored in said replacement mechanism selection register.

2. The cache of claim 1, wherein said translation unit is dynamically programmable.

3. The cache of claim 1, wherein said translation unit is a state machine.

4. The cache of claim 1, wherein:
said cache memory stores data in a plurality of cache lines, each cache line including a plurality of data words, said cache memory recalling a cache line including said currently required data if said currently required data is stored in said cache memory;
said cache further comprising:
a line buffer connected to said cache memory for storing a cache line recalled from said cache memory; and
a multiplexer connected to said main processor, said comparator and said line buffer, said multiplexer supplying to said main processor said currently required data from among said plurality of data words included in said cache line stored in said line buffer.

5. The cache of claim 1, and further comprising an address input register for storing the address of the currently required memory access.

6. The cache of claim 1, further comprising: an address register connected to said data memory and said address processor for storing an address calculated by said address processor for supply to said data memory for fetching data.

7. The cache of claim 1, wherein said address processor is in communication with said translation unit such that address translations and address calculations are consistent.

8. The cache of claim 1, wherein:
said cache memory is partitioned into at least two parts, a first part filled by said address processor according to a first cache replacement mechanism corresponding to an algorithm currently operating on said main processor and a second part prefilled by said address processor according to a second cache replacement mechanism corresponding to an algorithm next to be operating on said main processor.

9. The cache of claim 1, and further comprising a lookaside buffer for storing addresses of data stored in said cache, such that addresses of data required by said main processor may be mapped to addresses stored in said cache.

10. A method of using a cache memory in a signal processing system, comprising the steps of:
employing said signal processing system to determine a type of data access used by an algorithm currently being executed by said signal processing system, said type of data access corresponding to data most likely to be required by said algorithm currently being executed by said signal processing system;
storing a selection code indicating said type of data access used by said algorithm currently being executed by said signal processing system in a replacement mechanism selection register;
delivering a selection code representing said type to a cache address processor; and
programming said cache address processor to calculate addresses to fill said cache in accordance with said selection code.

11. The method of claim 10, wherein said selection code is provided via a register in communication with said address processor and a main processor of said signal processing system.

12. The method of claim 10, and further comprising the step of programming a translation unit such that it translates addresses of said cache in accordance with said type of data access.

13. The method of claim 12, wherein said programming of said translation unit comprises setting states of a state machine.

14. The method of claim 10, and further comprising the step of prefilling a part of said cache in accordance with a next type of data access to be used by an upcoming algorithm to be executed on said processor.

15. The method of claim 10, further comprising the steps of:

partitioning said cache memory into at least two parts;

said step of programming said cache address processor to calculate addresses to fill said cache filling a first part of said cache according to a first cache replacement mechanism corresponding to an algorithm currently operating on a main processor of said signal processing system; and programming said cache address processor to calculate addresses to prefill a second part of said cache according to a second cache replacement mechanism corresponding to an algorithm next to be operating on said main processor.

16. A signal processing system for processing data in real time, comprising:

a main processor for executing predetermined signal processing algorithms, each of said predetermined signal processing algorithms having a corresponding predetermined cache replacement scheme;

program memory for providing instructions to said main processor in accordance with said algorithms;

data main memory for providing data to be processed to said main processor in accordance with a main memory access scheme;

a data cache memory for providing data to be processed to said main processor;

a replacement mechanism selection register connected to said main processor, said replacement mechanism selection register storing an indication supplied by said main processor of said predetermined cache replacement scheme; and a data cache management unit connected to data main memory, said data cache memory and said replacement mechanism selection register for replacing a selected portion of said data cache memory from said data main memory in accordance with indicated predetermined cache replacement scheme stored in said replacement mechanism selection register.

17. The system of claim 16, wherein said data cache management unit has an address processor for calculating addresses for filling said cache in accordance with a manner in which data is used by an algorithm executed on said system.

18. The system of claim 15, wherein said data cache management unit has a programmable address translation unit for translating addresses provided by said processor to addresses used by said cache.

19. The system of claim 16, wherein:

said data cache memory is partitioned into at least two parts; and said data cache management unit filling a first part of said data cache memory according to a first cache replacement mechanism corresponding to an algorithm currently operating on said main processor and prefilling a second part of said data cache memory according to a second cache replacement mechanism corresponding to an algorithm next to be operating on said main processor.

* * * * *